G. A. SCOTT.

Tooth and Nail-Brush Handles.

No. 133,600.            Patented Dec. 3, 1872.

Witnesses.
D. P. Cowl
Edmund Masson

Inventor
George A. Scott,
By atty A. B. Stoughton

UNITED STATES PATENT OFFICE.

GEORGE A. SCOTT, OF NEW YORK, N. Y.

IMPROVEMENT IN TOOTH AND NAIL BRUSH HANDLES.

Specification forming part of Letters Patent No. 133,600, dated December 3, 1872.

*To all whom it may concern:*

Be it known that I, GEORGE A. SCOTT, of the city, county, and State of New York, have invented certain new and useful Improvements in the Manufacture of Tooth, Nail, and other similar Brush Handles; and I do hereby declare the following to be a full, clear, and exact description of the same, reference being had to the accompanying drawing making a part of this specification, in which—

Figure 1:
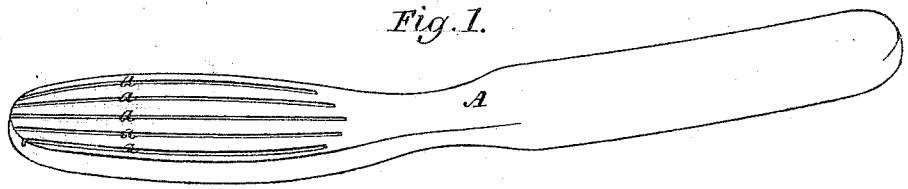
Figure 2:
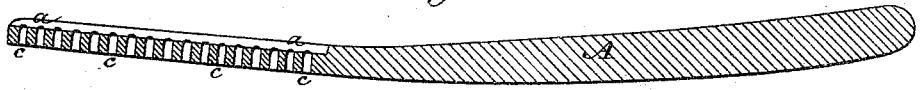

Figure 1 represents, in perspective, one of the handles in question. Fig. 2 represents a section through the same.

Tooth and nail brush handles have heretofore generally been made of bone, and sometimes of wood. These handles are first sawed out and then shaped by machinery. The holes for the bristles are then bored, and the slots for the wires, when used, cut in the backs thereof, thus requiring much machinery and frequent manipulation.

My invention consists in molding these handles, holes, slots, and shape or form at one operation, out of any suitable plastic material, and in molds prepared for such operation.

A composition which I have found suitable for these molded handles is composed of about equal parts of shellac, bone-dust, and white lead; but any other factitious bone, horn, or ivory may be used, which is first made into a plastic condition so that it can be molded. The mold or dies should be in two parts—the upper one having projecting parallel flanges, which will produce the grooves $a\ a$ in the back of the handle A, and the lower die having a series of projecting pins fixed in it, which will produce the holes $c\ c$. The contour of the handle and the ornamentation, if any, are given at the same time that the molding of the holes and slots is done, the composition being in such plastic condition as to receive any of the shapes, forms, holes, or slots. The dies, when the composition is placed therein, are brought together, and the whole subjected to sufficient pressure, so that when the dies are opened a complete finished handle will be the result.

The grooves $a$ intersect the holes $c$ for the usual purpose of admitting and concealing the wires by which the bristles are drawn into the brush-back and held, the grooves being afterward closed or filled with sealing-wax or other composition.

Having thus fully described my invention, what I claim as a new article of manufacture, and desire to secure by Letters Patent, is—

A tooth, nail-brush, or other similar brush handle, molded, shaped, and formed in dies, and at the same time and process furnished with molded grooves and holes by which the bristles are inserted and held.

GEO. A. SCOTT.

Witnesses:
 E. W. EATON,
 B. L. COOK.